Sept. 30, 1969    W. J. DE GAIN    3,469,295
WORKPIECE INDEXING AND FEED APPARATUS
Filed April 13, 1967    6 Sheets-Sheet 1

INVENTOR
WILLIAM J. DeGAIN

BY Hauke, Kraus, Gifford, & Patalidis
ATTORNEYS

Sept. 30, 1969 W. J. DE GAIN 3,469,295
WORKPIECE INDEXING AND FEED APPARATUS
Filed April 13, 1967 6 Sheets-Sheet 2

INVENTOR
WILLIAM J. DE GAIN

BY *Hauke, Krass, Gifford, & Patalidis*

ATTORNEYS

Sept. 30, 1969   W. J. DE GAIN   3,469,295
WORKPIECE INDEXING AND FEED APPARATUS
Filed April 13, 1967   6 Sheets-Sheet 3

INVENTOR
WILLIAM J. DeGAIN
BY Hauke, Krass, Gifford, & Pataledis
ATTORNEYS

FIG. 6

Sept. 30, 1969  W. J. DE GAIN  3,469,295
WORKPIECE INDEXING AND FEED APPARATUS
Filed April 13, 1967  6 Sheets-Sheet 5

INVENTOR
WILLIAM J. DeGAIN

BY Hauke, Kress, Gifford, & Patalidis
ATTORNEYS

United States Patent Office 3,469,295
Patented Sept. 30, 1969

3,469,295
WORKPIECE INDEXING AND FEED APPARATUS
William J. De Gain, Detroit, Mich., assignor to Koppy Tool Corporation, Ferndale, Mich., a corporation of Michigan
Filed Apr. 13, 1967, Ser. No. 630,698
Int. Cl. B23b 25/00; B23q 17/18
U.S. Cl. 29—57    12 Claims

ABSTRACT OF THE DISCLOSURE

An apparatus for serially transferring workpieces one at a time from a loading station to an unloading station through an indexing station and a machining station. The workpieces are elongated and substantially cylindrical and are provided with an indexing notch or recess at one end for engagement, at the orienting station, with an orienting head which angularly orients each workpiece around its longitudinal axis to a predetermined angular position, and the machining station is provided with a feeding mechanism for subsequently and serially feeding each oriented workpiece one at a time to an appropriate position for effecting a machining operation upon the workpiece, after which the feed mechanism returns the workpiece to the apparatus for transfer to the unloading station.

BACKGROUND OF THE INVENTION

The present invention belongs to a class of apparatus having a transfer mechanism capable of transferring workpieces serially from a loading station to a machining station where a machining operation is automatically effected, and of returning each workpiece to the transfer mechanism for transporting each workpiece serially to an unloading station. In order to effectuate the machining operation on an appropriate portion of the workpiece, an orienting station is generally disposed between the workpiece loading station and the machining station for orienting and positioning each workpiece in an appropriate position for the machining operation to be effected. Several apparatus according to the present invention can be disposed in succession such that diverse machining operations may be effected serially and automatically upon each workpiece.

The present invention has particular usefullness for effecting diverse automated machining operations on a production basis on substantially elongated workpieces, cylindrical in cross section. More specifically, the present invention has particular usefulness in effecting such automated machining operations on tubular workpieces such as motor vehicle steering columns and the like.

As will be explained hereinafter in further detail, the present invention in a typical embodiment includes a gravity loader for feeding elongated cylindrical workpieces one at a time to a transfer mechanism consisting of a horizontally axed rotatable drum-like conveyor member provided with equidistant saddles or holders for receiving each workpiece. Each workpiece is serially conveyed to an orienting station and from there to a machining station. During dwell periods in the motion of the transfer mechanism, in the course of which each workpiece is held in a stationary position as a result of the transfer mechanism indexing at regular intervals, each workpiece is properly oriented, if so required for the subsequent machining operation, after which each workpiece is fed by a feeding mechanism at the machining station, to a machining position for effecting the machining operation during another dwell period of the transfer and indexing mechanism. Each workpiece is then returned by the feeding mechanism to the transfer mechanism which subsequently advances each workpiece to an unloading station. By disposing several apparatus according to the present invention in a serial manner such that the unloading of workpieces from one apparatus corresponds to the loading of the next consecutive apparatus, a completely automated manufacturing line may thus be established where each machining operation is automatically effected, with considerable improvement in efficiency and productivity over conventional arrangements.

These and other objects and advantages of the present invention will become apparent when the following detailed description of examples of preferred embodiments of the invention is read in conjunction with the accompanying drawings wherein like reference numerals refer to like or equivalent parts and in which:

DETAILED DESCRIPTIONS OF THE PREFERRED EMBODIMENTS

Figure 6:
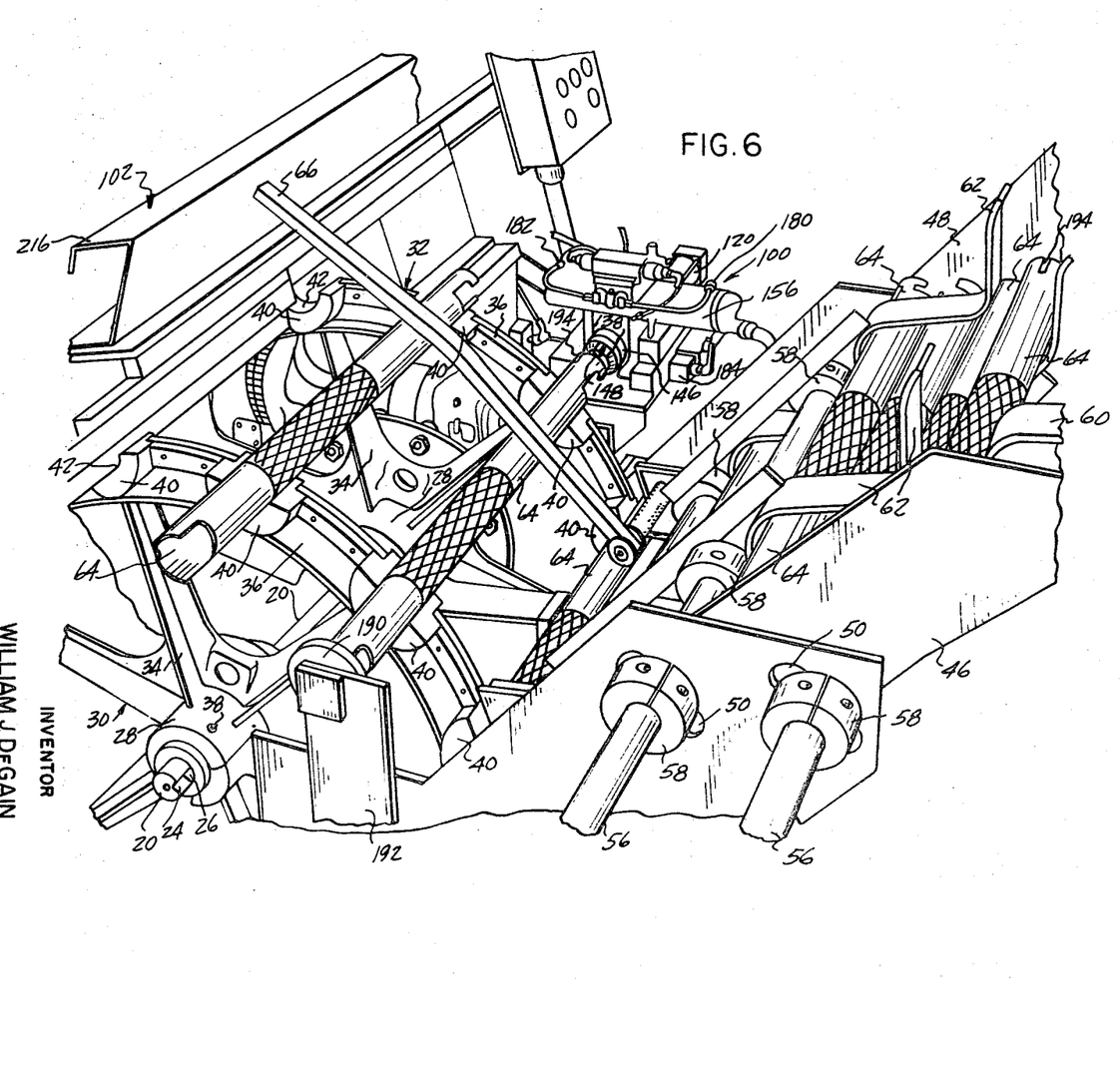
FIG. 6 is a perspective detailed view of the workpiece orienting station thereof.

Referring now to FIGS. 1-4 of the drawings, an example of embodiment of the present invention is illustrated as comprising a base 10 adapted for bolting in an appropriate position on a plant floor by means of conventional bolt-down studs and nuts 12. The base 10 has reinforcing webs or ribs 14, bolted or welded thereon, and supports by means of uprights such as 16 and 18, respectively the bearings (not shown) in which journals a horizontally axed shaft 20, and the drive mechanism, generally designated at 22, for such shaft. As best shown in FIG. 6, shaft 20 has a longitudinally extending keyway 24 for the key 26 disposed internally to the hub 28 of each one of a pair of parallelly disposed vertical wheels 30 and 32. Each wheel has a plurality of radially extending spokes 34 supporting an annular rim 36, and the axial separation of the wheels is adjustable by sliding the wheels away and toward each other so as to accommodate the length of workpieces in a production run. The wheels are held in their appropriate position along shaft 20 by means of a set screw 38 provided at each wheel hub 28.

The rim 36 of each wheel is provided at regular intervals with cut-out portions in which is disposed a saddle portion 40 presenting an arcuate seat 42. As shown more particularly in FIG. 1, a magnet 44 is disposed in each arcuate seat 42, for the purpose to be hereinafter explained. Each saddle 40 of one wheel has a corresponding saddle in the other wheel, and the arcuate seats 42 thereof are substantially aligned along an axis parallel to the longitudinal axis of the shaft 20 supporting the wheels.

Suitably supported by upright 18 there is on one end of the base 10 a pair of substantially parallel plates 46 and 48 provided with a plurality of elongated apertures as shown at 50. Plate 48 is fastened to upright 18 by means of a cross plate 52, see FIG. 3, welded thereon at right angle and bolted upon bracket 54 welded to upright 18 in such manner that plate 48 is laterally adjustable. Plate 46 is adjustably mounted away from plate 48 by means of rods 56 passing through the elongated apertures 50 and clamping the plates in appropriate position by means of split rings 58. A first plurality of rods 56 in addition supports a substantially zig zag-shaped pair of co-planar guide plates 60, while a second pair of zig zag-shaped plates 62 is supported by a second plurality of rods 56.

It can thus be seen that there is defined a gravity fed loading station 63 for cylindrical workpieces such as hollow tubular workpieces 64, consisting of a vertically stepped stairway-like channelway defined between guide plates 60 and 62 such as to reduce the pressure imposed upon the walls of any workpiece 64 located at the bottom of the stepped channelway so as to prevent crushing or distortion of the walls of the workpieces when the workpieces are made of substantially thin material. In addition, such a stepped stairway-like channelway re-aligns the workpieces at each step and thus tends to prevent jamming of the workpieces by providing a substantial reduction of the inertia of descending workpieces when reaching the bottom of the chute specially with respect to the first workpieces to reach such bottom at the start of a production run with an empty chute.

At the bottom of loading station 63, each workpiece 64 dropping by gravity through the stepped chute formed by the channelway between guide plates 60 and 62 is forced to engage a pair of arcuate seats 42 of a pair of corresponding saddles 40 in wheels 30 and 32. Each workpiece is held against the arcuate seats 42 of the saddles 40 by the combined action of magnets 44 and a hinged lever 66, best seen in FIG. 6. When shaft 20 is rotated, thus rotating wheels 30 and 32 in unison, the workpiece 64 engaged with a pair of saddles 40 is carried away thus supported on the periphery of the wheels and an empty pair of saddles is presented to the following workpiece at the bottom of the chute by guideplates 60–62, such that the subsequent workpiece is carried away by the subsequent pair of saddles 40 being indexed at the bottom of the chute.

Figure 3:
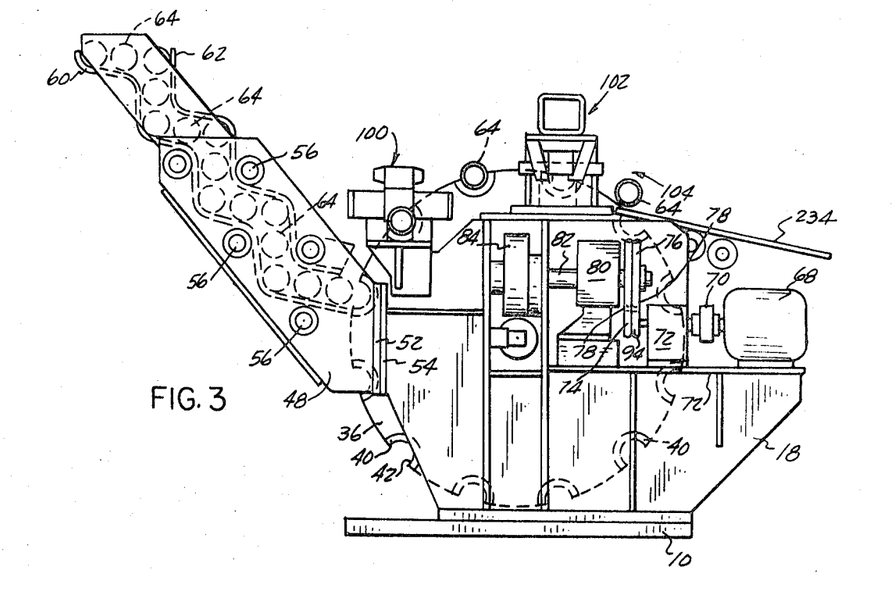
FIG. 3 is a side elevational view thereof.
Figure 4:
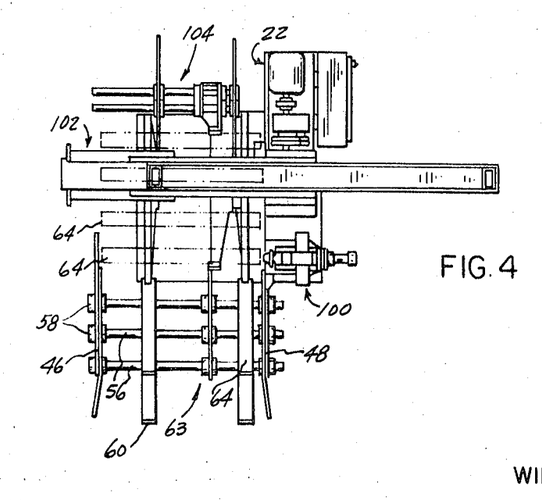
FIG. 4 is a top plan view thereof.
Figures 5, 9, 10, 13, 14:
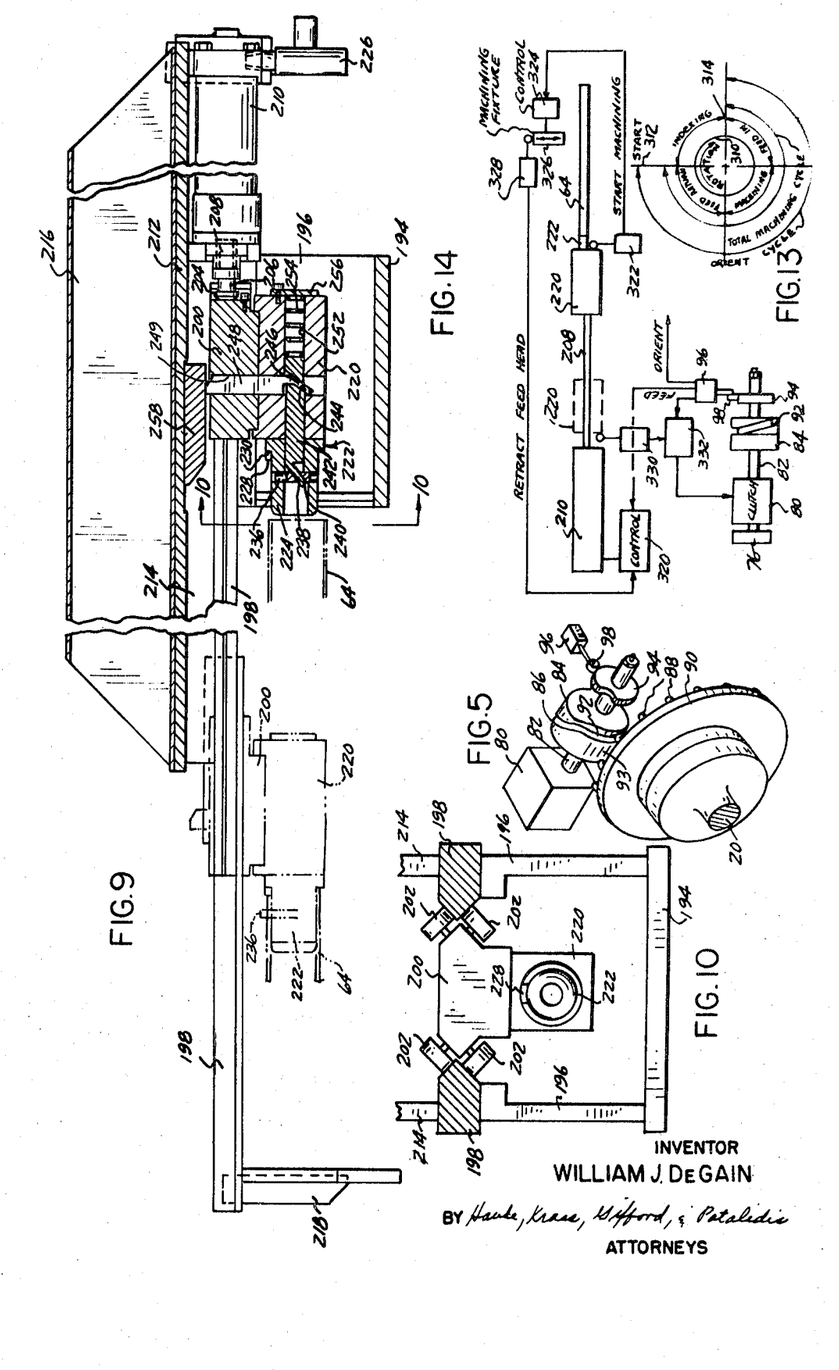
FIG. 5 is a schematic perspective view of the drive mechanism for the workpiece transfer mechanism.
FIG. 9 is a partial longitudinal sectional view of an example of workpiece feed mechanism of the machining station thereof.
FIG. 10 is a partial transverse section view from line 10—10 of FIG. 9.
FIG. 13 is an example of timing diagram of the transfer mechanism.
FIG. 14 is a simplified schematic diagram of an example of workpiece feed mechanism control system.

Shaft 20 and consequently wheels 30–32 are driven by the drive mechanism 22 comprising, as best seen in FIG. 3, an electric motor 68 driving through coupling 70, reduction gear 72 and a pair of pulleys 74 and 76 and belts 78, a clutch mechanism 80. The clutch mechanism 80 is adapted to intermittently drive driveshaft 82 on which is mounted a cam 84. Cam 84, as best shown in FIG. 5, is provided with a drive groove 86 adapted to engage a cam follower 88, a plurality of which is disposed in a circle on a drive plate 90 keyed on shaft 20. In this manner, when drive shaft 82 is rotated, cam shaft 84 is also rotated and one of the cam followers on drive plate 90 engages drive groove 86 of cam 84, thus rotating drive plate 90 of an amount corresponding to the distance separating consecutive cam followers 88. Drive groove 86 of cam 84 is provided with a straight portion 92 such that cam 84 presents a dwell portion 93 disposed between two consecutive cam followers for a predetermined angular rotation of the cam such that drive plate 90, during one complete revolution of the cam 84, is rotated a predetermined amount and is held stationary for a predetermined dwell period. Consequently, wheels 30–32 are subjected to a predetermined angular rotation followed by a predetermined dwell period during which they remain stationary.

As shown in FIG. 5, drive shaft 82 is adapted to rotate a cam wheel 94 having an appropriate peripheral contour for actuating a switch or valve 96 by means of cam follower 98. Switch 96 is adapted to sequentially operate, during the dwell period of rotation of wheels 30–32, orienting and feeding mechanisms to be hereinafter described in detail.

Figure 7:
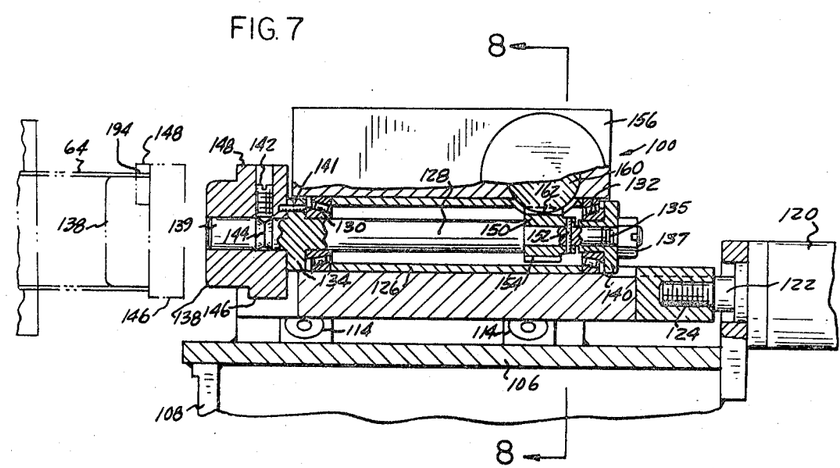
FIG. 7 is a partial longitudinal elevational view of the orienting mechanism at the orienting station with some portions shown in section.
Figure 8:
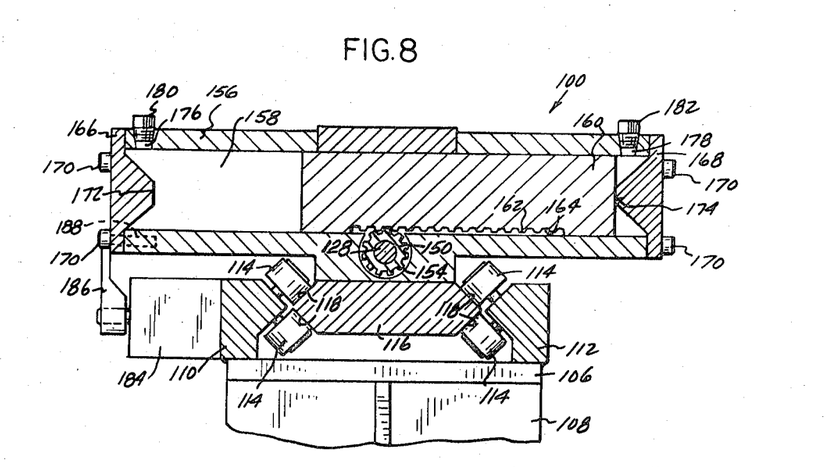
FIG. 8 is a transverse sectional view from line 8—8 of FIG. 7.

The workpieces 64 held in the aligned saddles 40 of wheels 30–32 are successively brought to an orienting station 100, a machining station 102 and an unloading station 104. As best seen in FIGS. 6–8, the orienting mechanism at the orienting station 100 comprises a support plate 106 welded or bolted onto a bracket attached to upright 18. Support plate 106 has two substantially parallel bearing blocks 110 and 112 fastened on the top thereof, which are adapted to support bearing rollers 114 having their axes of rotation disposed at right angles, as shown, and adapted to engage and support a slide 116 having V-ways 118 extending on both sides thereof such that slide 116 is reciprocable relative to bearing blocks 110 and 112. As best seen in FIGS. 6 and 7, a fluid cylinder 120 has a piston, not shown, on which is mounted a projecting rod 122 provided with a threaded end 124 engaging an appropriately threaded recess in slide 116 such that, when cylinder 120 is energized, slide 116 is reciprocated. On slide 116 is mounted a housing 126 supporting a spindle 128 for rotation around an axis parallel to the longitudinal axis of reciprocation of the slide. Spindle 128 is journalled with respect to housing 126 by way of tapered roller bearings 130 and 132 and is provided on the forward end thereof with a shoulder portion 134 and on the other end thereof with a threaded portion 135 for mounting of the spindle in the housing by means of nut 137 and washer 140.

A portion 139 of spindle 128 projects beyond shoulder portion 134 for mounting thereon of a mandrel or orienting head 138 appropriately angularly oriented with respect to spindle 128 and drivable thereof by means of longitudinally disposed pin 141 engaging aligned recesses in the shoulder portion 134 of the spindle 128 and the orienting head 138, and by means of radial set screw 142 whose end engages a groove 144 in the projecting end of the spindle. In the example shown, mandrel or orienting head 138 is provided with a shoulder portion 146 having a forwardly projecting indexing member in the form of a lug 148 for the purpose hereinafter to be indicated.

Spindle 128 is provided with a pinion 150 having teeth 154 and fastened to the spindle by means such as radial pin 152. Above housing 126 is disposed a cylinder housing 156 defining a cylinder bore 158 in which is disposed a piston member 160 reciprocable therein. The piston member 160 is provided with teeth 162 on a longitudinally disposed portion of the periphery thereof as to form a rack 164. Piston 160 is reciprocable within bore 158, but is prevented from rotating therein as a result of a longitudinal rack 164 engaging pinion 150.

Both ends of the bore 158 in cylinder 156 are closed by end caps 166 and 168 fastened thereon by conventional means such as bolts 170 and each provided with a projecting abutment portion as shown respectively at 172 and 174. Proximate both end caps 166 and 168, ports 176 and 178 are disposed through the wall of the cylinder 156, respectively connected to fluid pipes 180 and 182.

A limit switch or valve 184 is mounted, as best shown in FIG. 8, on plate 106 and is adapted to be actuated by means of a lever 186 having appropriate means such as pin 188 disposed for engagement with, for example, a portion of housing 156 when the latter is advanced to an appropriate position as a result of slide 116 being displaced toward the left, as shown in FIG. 7, as a result of energizing fluid cylinder 120. This limit switch or valve 184 is adapted to control the start of the operating cycle of piston 160 by introducing fluid to one end of cylinder bore 158 through one of the ports 176 and 178 while exhausting fluid from the other end thereof, so as to cause a complete alternate stroke of piston 160 with return to its start position with engagement with one of the abutments 172 or 174.

When a workpiece 64 is brought by wheels 30–32 to the orienting station 100, as shown in FIG. 6, fluid cylinder 120 is energized during a dwell period in the rotation of the wheels, thus advancing slide 116 and mandrel or orienting head 138 such that the orienting head 138 engages the hollow end of the workpiece 64. The other end of workpiece 64 is thus caused to engage a disk 190 supported by a bracket 192. Projecting indexing lug member 148 of mandrel or orienting head 138 engage the edge of workpiece 64, thus allowing slide 116 to be displaced a predetermined amount and tripping lever 186 of limit switch or valve 184.

The reciprocating cycle of piston 160 is thus started. Spindle 128 and consequently orienting head 138 are rotatably driven in a first direction by pinion 150 engaging rack 164 in piston 160, mandrel or orienting head 138 being rotated more than 360°, with workpiece 64 being held stationary as a result of the frictional engagement of the periphery of the workpiece with the surfaces of the saddles arcuate seats 42 and of the attraction of magnets 44, and as a result of the frictional engagement of the other end of the workpiece with the stationary disk 190 which all amount to a greater force than the frictional driving force of indexing lug 148 engaging the edge of the workpiece under the purposely weak pressure resulting from the action of cylinder 120.

The end of workpiece 64 is provided with an indexing recess 194 for engagement with indexing lug 148 on mandrel or orienting head 138 as soon as the rotation of the head aligns indexing lug 148 with such indexing recess 194 in the workpiece. When this happens, under the forwardly directed pressure resulting from the action of hydraulic cylinder 120, mandrel or orienting head 138 further advances a small amount such that the shoulder portion 146 thereof engages the edge of the workpiece with indexing lug 148 engaged into indexing recess 194 in the workpiece, as shown in phantom lines in FIG. 7. Thereafter, workpiece 64 is positively rotatably driven by the rotation of mandrel or orienting head 138 until piston 168 reaches the end of its stroke and is caused to reciprocate in an opposite direction as a result of fluid being exhausted from one side of the piston while fluid is being admitted to the other side of the piston. Piston 160 during its return stroke rotates spindle 128 and consequently mandrel or orienting head 138 more than 360° in an opposite direction until the head of piston 160 engages one of the abutments 172 or 174. Thus workpiece 64 is rotated back to a predetermined angular position about its longitudinal axis and, as soon as this predetermined angular position corresponding to the end of a complete indexing cycle is reached, mandrel or orienting head 138 is retracted so as to allow the workpiece to be transferred to a next position resulting from the angular rotation of wheels 30–32. The rotation of mandrel or orienting head 138 in a first direction of more than 360° followed by a rotation in an opposite direction of more than 360° with return always to the same angular position permits indexing lug 148 to engage indexing recess 194 in a workpiece generally during the first angular rotation of the mandrel, but, if indexing lug 148 misses indexing recess 194 in the workpiece during the first angular rotation of the mandrel or orienting head 138 in the first direction, the chances are that the indexing lug 148 will engage the indexing recess 194 in the workpiece during the rotation of the orienting head in the opposite direction. Furthermore, because the workpiece orienting cycle always terminates at a predetermined angular position of mandrel or orienting head 138 following a rotation in a predetermined direction, the workpieces 64 are all oriented alike previously to the consecutive machining operation to be effected at machining station 102.

If workpiece 64 is not properly oriented, this is detected by orienting head 138 and spindle 148 being prevented from being longitudinally displaced to the position whereby shoulder portion 146 of orienting head 138 engages the end of workpiece 64. An appropriate limit switch, which may be limit switch 184 or any other appropriate limit switch adapted to detect the amount of longitudinal advance of slide 116, is then prevented from being tripped with the result that, through appropriate safety interlock, the apparatus is stopped.

Figure 1:
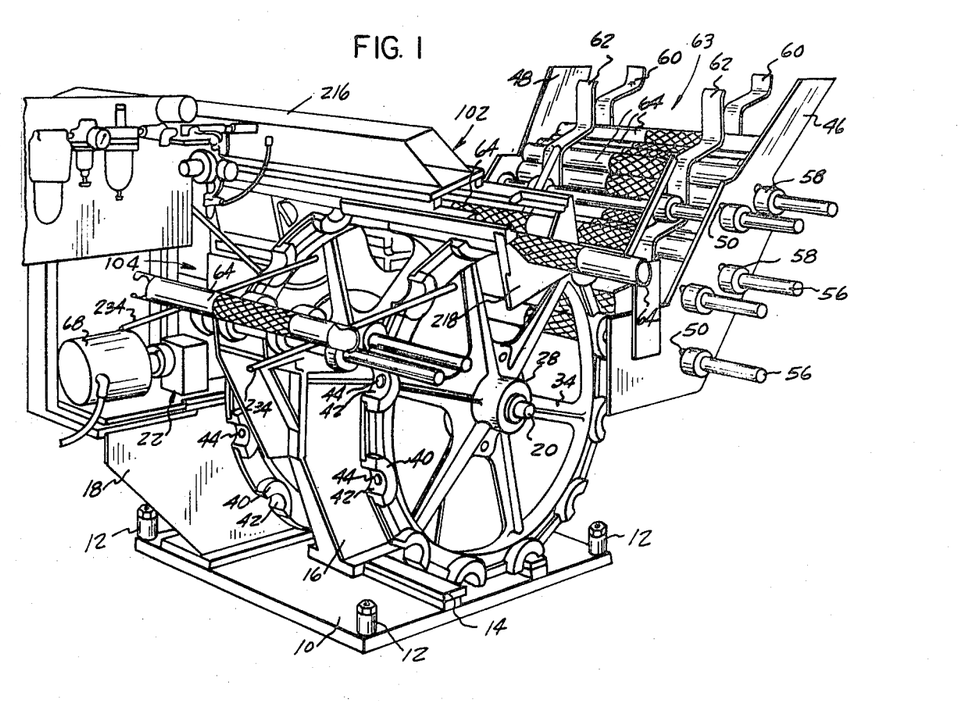
FIG. 1 is a perspective view of an example of embodiment of the present invention.
Figure 2:
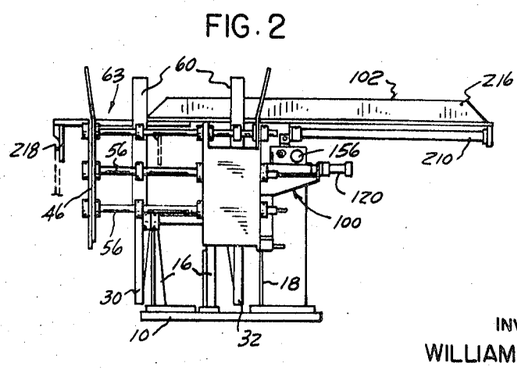
FIG. 2 is an end elevational view thereof as seen from the workpiece loading station end.

From orienting station 100, the oriented workpieces 64 are ultimately transferred as a result of the incremental rotation of wheels 30 and 32 to a position corresponding to machining station 102 wherein they are fed from the seats 42 of the saddles 40 onto an appropriate machining fixture or tooling, not shown. As shown in FIGS. 1 and 9, the machining station 102 includes a feeding mechanism comprising a support plate 194 bolted to upright 18 of the apparatus framework and comprises side brackets 196 adapted to support a pair of symmetrically disposed parallel V-ways 198. A slide 200 is supported for reciprocation with respect to the V-ways 198 by means of rollers 202, and the rearward portion of slide 200, as best seen in FIG. 9, is tied by means of slot 204 therein to the shouldered end portion 206 of the reciprocable rod 208 mounted on the end of a piston, not shown, disposed in the bore of an elongated fluid actuated cylinder 210 bolted in turn held below a support plate 212 held by upright walls 214, mounted on the top of V-ways 198. A box-like weldment, designated at 216, is fastened to the top of support plate 212 so as to insure substantial strength and rigidity to the whole assembly for preventing deflection thereof.

On the forward end of V-ways 198 there is disposed an appropriate tying bracket 218 for connection to an appropriate tooling fixture or apparatus, such as a punch press or appropriate cutting tools, not shown.

Slide 200 supports a housing 220 bolted or welded therebelow in which is mounted an appropriate feed head 222 comprising, in the example shown in FIGS. 9 and 10, a projecting portion 224 engageable with the hollow end of each workpiece 64 consecutively brought to the machining station. It can thus be seen that when fluid cylinder 210 is activated, as a result of fluid being timely introduced into the cylinder by means of a valve 226, rod 208 is displaced to the left, as seen in FIG. 9, thus displacing slide 200 and housing 220 to the left. Feed head 222 engages the hollow portion of the workpiece 64 and an appropriate locking mechanism, depending on the contour or shape of the workpiece end, is adapted to grip the end of the workpiece so as to lift the workpiece slightly off the arcuate seats 42 of the saddle 40 of wheels 30 and 32 with an abutment 228 on the feed head adapted to engage the indexing recess 194 in the end of the workpiece 64. The end edge of the workpiece engages an abutment such as shoulder portion 230 of the feed head, and the workpiece is longitudinally translated to a position whereby a portion thereof projects beyond bracket 218 into the appropriate machining fixture or tools so as to effectuate upon the workpiece whatever machining operation is required. When the machining operation has been effected in the coure of a dwell period in the rotational motion of wheels 30–32, the piston rod 208 is returned to a position retracting feed head 222 to the position shown in full lines in the drawing, thus returning the workpiece 64 to its original location in engagement with the arcuate seats 42 of saddles 40 for transfer, in the course of the next indexing of the transfer wheels 30–32, to an ejection station 120, FIGS. 1, 3 and 4, where the workpiece 64 are serially stripped from the saddles 40 by way of stationary bars 234.

In the example of workpiece feed mechanism at the machining station shown in FIGS. 9 and 10, a radial pin 236 is disposed in the feed head 222 in a position that longitudinally and radially corresponds to an aperture through the wall of the workpiece 64 when indexing lug 228 engages the indexing slot or recess 194 in the workpiece end. Pin 236 is provided with an inclined transverse aperture 238 which is slidably engaged by the inclined projecting ramp portion 240 of a plunger 242 having an inclined ramp 244 on the other end thereof, formed by an inclined transverse aperture in the plunger which is engaged by corresponding inclined projecting wedge portion 246 on the end of an actuating finger 248 having a longitudinal axis substantially vertical and slidable in recess 249 in slide 200 and housing 220. Plunger 242 is slidable in bore 252 in housing 220 and is normally biased to the left, as seen in the drawing, by means of coil spring 254, held by means of cap 256 and engaging end 250 of the plunger. Consequently, under the action of the spring bias upon plunger 242 being directed to the left finger 248 tends to project through the top of slide 200, with pin 238 projecting from the top of feed head 220, as shown in phantom lines in FIG. 9. However, when fluid cylinder 210 has retracted slide 200 to the position shown in full lines in the drawing, the projecting end of finger 248 engages a block 258 mounted below plate 212 in such a manner that finger 248 is caused to be displaced downwardly, as shown in the drawing. This in turn displaces plunger 242 toward the right, thus causing radial pin 236 to be retracted within the body of feed head 220. When feed head 222 is displaced to the left, pin 236 is caused to project and engage an appropriate aperture proximate the end of workpiece 64 such that when slide 200 is retracted to its extreme rightward position, as shown in the drawing, feed head 222 carries the workpiece back to its original position away from the machining or tooling fixture.

Figure 11:
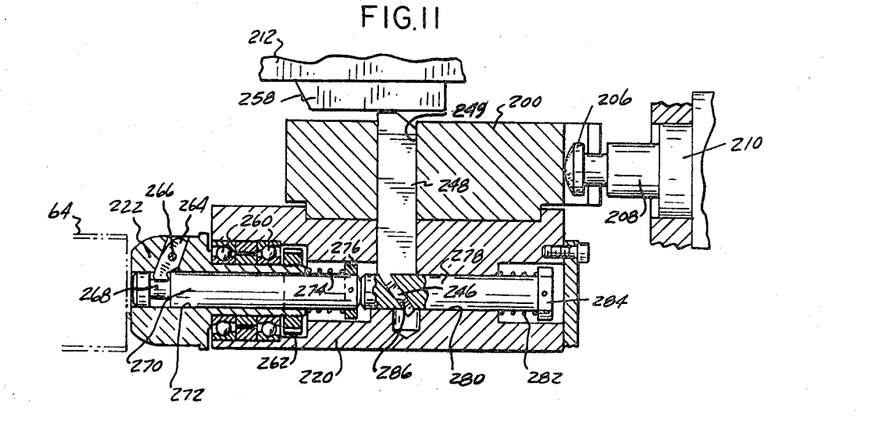
FIG. 11 is a modification of the mechanism of FIG. 9.

Some machining operations may require that each workpiece be rotatably indexed or spinned around its axis. When such is the case, the machining feed head 222 is designed, so as to be rotatable, substantially according to the structure shown in FIG. 11. The feed head 222 is held from the housing 220 by means of roller bearings 260, or the like, held in assembly by retainer nut 262, such that the feed head is capable of rotation relatively to housing 220. A chuck means is provided in the feed head 222 for engaging the end of the workpiece so as to allow the workpiece to be rotatable when displaced to its machining position in the machining fixture, such gripping or chuck means being shown in the drawing as consisting of a plurality of internally engaging gripping fingers 264 radially and angularly disposed as shown, each gripping finger 264 being pivotable about a pin 266 and having its inwardly disposed end engaging a groove 268 on the end of a rod 270 disposed for longitudinal displacement within a longitudinal bore 272 in the feed head 222. A coil spring 274 engaging a retainer washer 276 disposed on the end of rod 270 tends to normally displace the rod to the right, as shown in FIG. 11, so as to pivot fingers 260 such that their outer ends protrude from the periphery of feed head 222. A plunger 278 disposed in the end of the longitudinal bore 280 in housing 220 is also urged to the right, as shown in the drawing by coil spring 282 held under compression by a retainer washer 284 on the right end of the plunger and has its other end engaging the inner end of rod 270.

An actuating finger 248 disposed in the pocket 249 in slide 200 and housing 220 is provided with inclined ramp projecting end 246 engaged in an angularly disposed inclined radial aperture 286 in pin 278. Consequently, when the upper end of finger 248 engages block 258, pin 278 and rod 270 are displaced to the left, as shown in the drawing, and the outer ends of fingers 264 are retracted below the peripheral surface of feed head 222. When, on the contrary, finger 248 is not held in the retracted position shown in the drawing as a result of not engaging block 258 when slide 200 and housing 220 are displaced toward the left by the action of rod 208 of fluid cylinder 210, plunger 278 and rod 270 are permitted to be displaced to the right under the action of coil springs 282 and 274 respectively, with the result that fingers 264 are pivoted around pivot pins 266 such that their peripheral ends are allowed to project beyond the peripheral surface of feed head 222, thus gripping the inner surface of the workpiece 64. The workpiece may then be rotated by appropriate drive means such that a machining operation which requires rotation of the workpiece can be effected thereupon.

Figure 12:
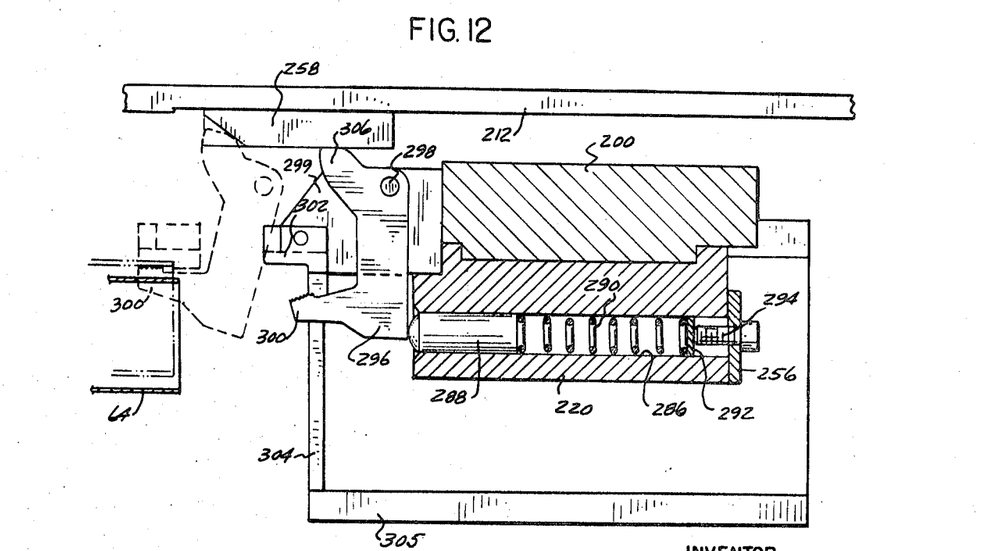
FIG. 12 is a further modification of the mechanism of FIG. 9.

A further modification of feed head structure is represented in FIG. 12 wherein there is mounted upon slide 200 a housing 220 having a longitudinal bore 286 in which is disposed a plunger 288 normally biased toward the left by means of a coil spring 290 disposed between the inner end of the plunger and a retainer 292 by forming a means for adjusting the force of spring 290 when a screw 294 engaging retainer 292 is threaded through end cap 256. The forward end of pin 288 engages the rear surface of a finger 296 adapted for fulcrum about pivot 298 on a bracket 299 mounted on slide 200. Finger 296 has a gripping or movable jaw end 300 adapted to cooperate with a fixed jaw 302 mounted on the end of a bracket 304 fastened to a plate 305 in turn attached to slide 200. On the end of finger 296, proximate pivot pin 298, there is a projecting integral ramp portion 306 adapted to engage block 258. When slide 200 is in a retracted position, finger 296 is in the position shown in full line in the drawing and movable jaw end 300 is disposed a predetermined distance from fixed jaw 302. When slide 200 begins its translation to the left, as seen in the drawing, one side wall of workpiece 64 becomes engaged between separated jaws 300 and 302. When slide 200 has been sufficiently displaced to the left such that projecting ramp portion 306 of finger 296 no longer engages block 258, such position being shown in phantom line in the drawing, under the action of spring biased plunger 288 finger 296 is pivoted around pin 298 to the position causing the side wall of the workpiece 64 to be gripped between movable jaw end 300 and stationary jaw 302. At the same time, workpiece 64 is lifted to the position shown in phantom lines in FIG. 12 such as to no longer engage the arcuate surfaces 42 of the transfer wheel saddles 40. The workpiece is subsequently, as a result of the displacement of slide 200 to its final position to the left, longitudinally transferred to a machining fixture, and after the machining operation has been effected, the workpiece is retracted and returned to its original location on the transfer mechanism, following which jaws 300 and 302 separate as a result of projecting ramp end 306 of pivoting finger 296 engaging block 258.

Referring now to the diagram of FIG. 13, there is shown a circle 310 arbitrarily representing a complete revolution of cam 84 of FIGS. 3 and 5. A complete revolution of the cam may be effected in any appropriate convenient time period such as, for example, six seconds, so as to allow, as hereinbefore explained, ample time for indexing, orienting and machining the workpieces. From the start of the rotation of the cam 84, as shown at line 312 on the diagram of FIG. 13, until the cam has effected a quarter revolution or about 90° as shown by line 314, the cam indexes the transfer mechanism by rotating transfer wheels 30–32, as a result of cam groove 92 engaging one of the cam follower 88 on disc 90 mounted on shaft 20 driving transfer wheels 30–32, as shown in FIG. 5. During the following three-fourths of a revolution of cam 84, there occurs the dwell period during which the transfer wheels 30–32 are held stationary, and this dwell period, represented in the diagram of FIG. 13 by a rotation of 270° of the cam from line 314 back to start position 312, amounting in time in the present example to approximately 4.5 seconds. The dwell period is utilized for orienting a workpiece at the orienting station of the apparatus and for feeding a workpiece at the machining station to a machining position, effecting the machining operation, and returning the workpiece back to its original position on the transfer mechanism. As indicated in FIG. 13, the time allocated for feeding a workpiece to its machining position is typically of a duration of approximately 1.5 seconds, corresponding to a 90° rotation of the cam during such dwell period, immediately following the indexing rotation of the cam. The time allocated for machining is typically also of approximately 1.5 seconds, corresponding to the next 90° rotation of the cam, and the time allocated for returning the workpiece to its original position on the transfer mechanism is also approximately of 1.5 seconds, therefore corresponding to the last 90° rotation of the cam returning it to its original start position.

The apparatus according to the present invention is self-timing in that, as hereinafter explained in further details, in the event that the total machining operation takes a longer period of time to be accomplished than the time allocated for such machining operation, the transfer mechanism is prevented from indexing the transfer wheels to the next position until the machined workpiece has been properly returned to its original position in the saddles on the transfer wheels.

As shown in FIG. 5, and more particularly in FIG. 14, cam 94 mounted on drive shaft 82 for rotation in unison with cam 84 has a peripheral contour designed to actuated switch or valve 96 by means of cam follower 98. Switch or valve 96 controls the start of the workpiece orienting and machining cycles. As shown in FIG. 14, switch or valve 96 is adapted to actuate the control 320 for the feed head fluid cylinder 210, such that feed head slide 220 is displaced to a position that transfers a workpiece 64, engaged by feed head 222, to a machining position with respect to the machining fixture or tooling. When slide 220 reaches such a position, it trips switch or valve 322 which is adapted to activate the control 324 starting the cycle of the machining fixture or tooling 326. The machining operation is effected upon the workpiece 64, following which the machining fixture, such as forming dies or the like, disengages from the workpiece and returns to a rest position causing a switch or valve 328 to be actuated. Switch or valve 328 in turn signals the control 320 of feed head cylinder 210 to retract feed head slide 220, thus returning the workpiece 64 to its original position on the transfer mechanism. When feed head slide 220 is fully retracted, it engages the control member of switch or valve 330. Switch or valve 330 is adapted to normally cause clutch 80 to become deenergized after cam 84 has rotated a complete revolution and returned to its starting position unless engaged by feed head slide 220. This is accomplished by having the actions of switch or valve 330 and switch or valve 96 tied together by means of interlock 332 such that switch or valve 96, actuated by cam 94 at a predetermined angular position thereof corresponding to start position 312 in the diagram of FIG. 13, controls clutch 80 to disengage, unless switch or valve 330 is engaged by slide 220 as a result of returning to its original position shown in interrupted lines in FIG. 14. Therefore clutch 80 is caused to disengage when cams 84 and 94 have accomplished a complete revolution without a workpiece 64 being returned to the transfer mechanism after completion of a machining operation, and clutch 80 is caused to re-engage as soon as the slide 220 has returned to its position returning the workpiece to the transfer wheels.

It can thus be seen that an apparatus according to the present invention is self-timed by construction, and that the duration of a machining operation is actually the determining factor as to the rate of production of the apparatus.

In addition, it is apparent that an apparatus according to the present invention may be built utilizing a minimum number of standardized elements which are made adaptable to diverse workpiece sizes and configurations. For example, the separation between transfer wheels 30 and 32 is adjustable so as to accommodate a production run of workpieces having a length different from the length of workpieces in another production run. The orienting and feed heads, respectively at the orienting and machining stations, are interchangeable with other orienting and feeding heads having a configuration matching the configuration of the workpieces, and the whole apparatus is designed such as to be flexibly adaptable to diverse production rates and to be usable with diverse machining operations, as required. By utilizing the building-block or modular principles of the invention, manufacturing units may be added or removed as required, and as many units are as necessary may be tied together in a production line.

The detail of the other diverse electrical and/or hydraulic interconnections between the several elements forming the present invention has been omitted from the hereinbefore description, as such interconnections and inter-relations are of course of common knowledge to those skilled in the art.

It is obvious that the type of feed head design incorporated at the machining station is dependent upon the appropriate configuration of the workpiece engaged by such feed head and at the same time dependent upon the type of machining operation to be effected upon the workpiece. It is also obvious that for certain machining operations, the workpiece orienting station and mechanism are not required and may be omitted. Although described in combination with a transfer mechanism consisting of a workpiece rotary holding and indexing device, the orienting mechanism and the workpiece feeding mechanisms of the invention may obviously be incorporated into other types of workpiece transfer mechanisms.

It is obvious that several apparatus according to the herein described invention may be interconnected in series such that workpieces may be transferred from a transfer mechanism to another by tying together the input of one transfer mechanism with the output of a preceding transfer mechanism such that a succession of machining operations may be effected automatically and sequentially.

From the preceding description considered in conjunction with the accompanying drawings, it will be evident to those skilled in the art that many changes, modifications and omissions may be made without departing from the spirit and scope of the present invention as expressed in the appended claims.

I claim:
1. In a machine tool for handling elongated substantially cylindrical workpieces having at least one end provided with an indexing recess,
    transfer means for serially transferring said workpieces one at a time from a loading station to a machining station,
    a workpiece orienting station disposed between said loading station and said machining station, and
    workpiece orienting means at said workpiece orienting station, said orienting means comprising:
        an indexing member engageable with said indexing recess for rotatably driving said workpiece around its longitudinal axis, and
        means for rotating said indexing member and said workpiece to a predetermined angular orientation,
    wherein said machining station comprises,
    means engaging an end of said workpiece,
    means longitudinally displacing said workpiece to a machining position to effectuate a machining operation on said workpiece, and
    means returning said workpiece to its initial position after said machining operation has been effected.

2. A machine tool as claimed in claim 1, wherein said indexing member is first rotated more than 360° from a start angular position and then rotated in an opposite direction back to its start position.

3. A machine tool as claimed in claim 1 wherein said machining station further comprises means inhibiting the operation of said transfer means until said workpiece has been returned to its initial position.

4. A machine tool as claimed in claim 1 wherein said means for transfering said workpiece one at a time is a horizontally axed rotatable member provided with uniformly spaced holders each adapted to hold a workpiece.

5. A machine tool as claimed in claim 4 wherein said rotatable member comprises:
a pair of parallel wheels each having aligned saddle portions for supporting a workpiece.

6. A machine tool as claimed in claim 5 wherein each saddle portion comprises a magnet for holding said workpiece therein.

7. A machine tool as claimed in claim 6 wherein said means engaging an end of said workpiece lifts said workpiece a minute distance from said saddle portions.

8. In a machine tool, orienting means for angularly orienting elongated workpieces serially transferred from a loading station to a machining station, said workpieces being each provided with an indexing recess in one end thereof, said orienting means comprising:
an indexing member engageable with said indexing recess,
support means for said indexing member,
means for longitudinally displacing said support means for engagement of said indexing member with said end of each said workpiece, and
means for rotating said support means more than 360° in a first direction and for subsequently rotating said support means more than 360° in an opposite direction.

9. The orienting means of claim 8 wherein:
said support means is a rotatable spindle having its longitudinal axis substantially aligned with the longitudinal axis of said workpiece,
said spindle is mounted on a slide arranged for longitudinal reciprocation,
a fluid operated piston is adapted for reciprocation in a cylinder fastened to said slide, and
said piston is operatively connected to said spindle so as to rotatably drive said spindle.

10. In a machine tool comprising means for serially transferring elongated workpieces one at a time to a machining station, workpiece feeding means disposed at said machining station comprising:
means engaging one end of said workpiece, and
means for longitudinally displacing said means for carrying said workpiece to a machining position permitting a machining operation to be effected on said workpiece and for returning said workpiece to its original position,
wherein said means engaging one end of said workpiece includes means gripping said workpiece for positive engagement therewith for return of said workpiece to said original position.

11. The workpiece feeding means of claim 10 further comprising:
means rotatably supporting said means engaging one end of said workpiece for permitting said workpiece to be spun during said machining operation.

12. The workpiece feeding means of claim 10 further comprising means inhibiting said means for serially transferring the elongated workpieces until said workpieces feeding means has returned said workpiece from said machining position to the workpiece original position.

References Cited
UNITED STATES PATENTS

| | | | |
|---|---|---|---|
| 2,677,169 | 5/1954 | Cybulski | 29—57 |
| 2,829,424 | 4/1958 | Brown | 29—57 |

RICHARD H. EANES, JR., Primary Examiner